(12) United States Patent
Nakashimo (10) Patent No.: US 10,078,015 B2
(45) Date of Patent: Sep. 18, 2018

(54) TEMPERATURE DETECTION CIRCUIT AND SEMICONDUCTOR DEVICE

(71) Applicant: Seiko Instruments Inc., Chiba-shi, Chiba (JP)

(72) Inventor: Takao Nakashimo, Chiba (JP)

(73) Assignee: ABLIC INC., Chiba (JP)

( * ) Notice: Subject to any disclaimer, the term of this patent is extended or adjusted under 35 U.S.C. 154(b) by 426 days.

(21) Appl. No.: 14/934,323

(22) Filed: Nov. 6, 2015

(65) Prior Publication Data

US 2016/0131535 A1 May 12, 2016

(30) Foreign Application Priority Data

Nov. 11, 2014 (JP) .................................. 2014-228673

(51) Int. Cl.
*H02H 5/04* (2006.01)
*G01K 7/01* (2006.01)

(52) U.S. Cl.
CPC ............... *G01K 7/01* (2013.01); *H02H 5/044* (2013.01)

(58) Field of Classification Search
USPC ........................................................ 361/103
See application file for complete search history.

(56) References Cited

U.S. PATENT DOCUMENTS

| | | | | |
|---|---|---|---|---|
| 5,796,290 A * | 8/1998 | Takahashi | ................. | G01K 7/01 307/651 |
| 6,034,567 A * | 3/2000 | Umezawa | ........... | H03F 3/45479 330/253 |
| 6,255,892 B1 * | 7/2001 | Gartner | .................... | G01K 7/01 327/512 |
| 6,316,971 B1 * | 11/2001 | Ohashi | .................... | G01K 7/01 327/512 |
| 8,174,309 B2 * | 5/2012 | Yoshino | ................. | G05F 3/242 327/541 |
| 8,188,785 B2 * | 5/2012 | Iacob | ....................... | G05F 1/10 327/543 |

(Continued)

FOREIGN PATENT DOCUMENTS

JP 2007-312529 A 11/2007

*Primary Examiner* — Ronald W Leja
(74) *Attorney, Agent, or Firm* — Brinks Gilson & Lione (57) ABSTRACT

Provided is a temperature detection circuit having less manufacturing fluctuations in detection temperature and capable of easily adjusting the manufacturing fluctuations in detection temperature. The temperature detection circuit includes: a constant current circuit configured to output a constant current; a voltage-controlled current circuit, which is controlled by a voltage output from a heat sensitive element and is configured to output a current corresponding to temperature; and a current comparator configured to compare the constant current and the current corresponding to temperature, and output a detection signal indicating that a predetermined temperature is detected. Temperature characteristics of the constant current circuit and temperature characteristics of the voltage-controlled current circuit have a correlation with each other. The temperature detection circuit is configured to detect temperature based on a result of comparing the output current of the constant current circuit and the output current of the voltage-controlled current circuit.

7 Claims, 7 Drawing Sheets

(56) References Cited

U.S. PATENT DOCUMENTS

| | | | | |
|---|---|---|---|---|
| 8,451,571 | B2* | 5/2013 | Imura | G05F 1/569 |
| | | | | 327/513 |
| 9,632,521 | B2* | 4/2017 | Iriarte | G05F 3/242 |
| 2001/0020844 | A1* | 9/2001 | Andoh | G05F 3/245 |
| | | | | 323/316 |
| 2007/0263334 | A1* | 11/2007 | Nishida | H02H 3/087 |
| | | | | 361/103 |
| 2010/0176839 | A1* | 7/2010 | Sugiura | H03K 19/0008 |
| | | | | 324/764.01 |
| 2010/0321845 | A1* | 12/2010 | Imura | G05F 1/569 |
| | | | | 361/86 |
| 2015/0115930 | A1* | 4/2015 | Hashitani | G05F 3/16 |
| | | | | 323/313 |
| 2015/0309528 | A1* | 10/2015 | Igarashi | G05F 5/00 |
| | | | | 323/303 |
| 2016/0131535 | A1* | 5/2016 | Nakashimo | G01K 7/01 |
| | | | | 361/103 |

* cited by examiner

TEMPERATURE DETECTION CIRCUIT AND SEMICONDUCTOR DEVICE

RELATED APPLICATIONS

This application claims priority under 35 U.S.C. § 119 to Japanese Patent Application No. 2014-228673 filed on Nov. 11, 2014, the entire content of which is hereby incorporated by reference.

BACKGROUND OF THE INVENTION

1. Field of the Invention

The present invention relates to a temperature detection circuit for use in an overheat protection circuit or the like.

2. Description of the Related Art

Figure 6:
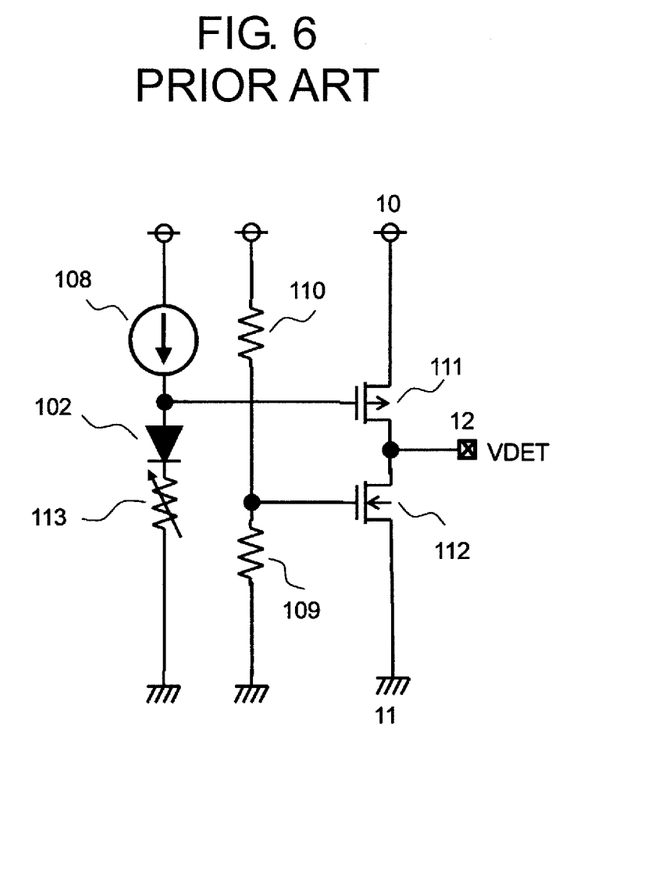
FIG. 6 is a diagram for illustrating a related-art temperature detection circuit.

FIG. 6 is a circuit diagram for illustrating a configuration example of a related-art temperature detection circuit.

A constant current circuit 108, a diode 102, and a variable resistor 113 are connected in series between a power supply terminal 10 and a ground terminal 11. The diode 102 has an anode connected to the constant current circuit 108 and a gate of a P-channel transistor 111, and a cathode connected to the variable resistor 113. A resistor 109 and a resistor 110 are connected in series between the power supply terminal 10 and the ground terminal 11. A node between the resistor 109 and the resistor 110 is connected to a gate of an N-channel transistor 112. The P-channel transistor 111 has a source connected to the power supply terminal 10 and a drain connected to an output terminal 12. The N-channel transistor 112 has a drain connected to the output terminal 12 and a source connected to the ground terminal 11.

When temperature increases, a voltage generated across the diode 102 decreases, and the absolute value of a threshold voltage (Vth) of the P-channel transistor 111 decreases. Accordingly, when temperature increases, the threshold voltage (Vth) of the P-channel transistor 111 and a voltage between the power supply terminal 10 and the gate terminal of the P-channel transistor 111 are reversed in magnitude, and then the P-channel transistor 111 is turned on. Thus, a voltage of the output terminal 12 is inverted from a voltage of the ground terminal 11 to a voltage of the power supply terminal 10.

A resistance value of the variable resistor 113 is set to an appropriate value in order to adjust a detection temperature of the temperature detection circuit.

In the related-art temperature detection circuit, however, in order to adjust the detection temperature, the resistance value of the variable resistor 113 needs to be adjusted in consideration of the threshold voltage of the P-channel transistor 111 and its temperature characteristics, a current value of the constant current 108 and its temperature characteristics, and temperature characteristics of the variable resistor 113.

SUMMARY OF THE INVENTION

The present invention has been devised in order to solve the problem as described above, and realizes a temperature detection circuit capable of easily adjusting a detection temperature and capable of improving accuracy.

A temperature detection circuit according to one embodiment of the present invention includes: a constant current circuit configured to output a constant current; a voltage-controlled current circuit, which is controlled by a voltage output from a heat sensitive element and is configured to output a current corresponding to temperature; and a current comparator configured to compare the constant current and the current corresponding to temperature, and output a detection signal indicating that a predetermined temperature is detected. In the temperature detection circuit, temperature characteristics of the constant current circuit and temperature characteristics of the voltage-controlled current circuit have a correlation with each other. The temperature detection circuit is configured to detect temperature based on a result of comparing the output current of the constant current circuit and the output current of the voltage-controlled current circuit.

According to the temperature detection circuit in the one embodiment of the present invention, the temperature characteristics of the constant current circuit and the temperature characteristics of the voltage-controlled current circuit controlled by the voltage of the heat sensitive element have a correlation with each other. Consequently, there is an effect that manufacturing fluctuations in detection temperature are small and the detection temperature may be easily adjusted against the manufacturing fluctuations.

DETAILED DESCRIPTION OF THE PREFERRED EMBODIMENTS

Figure 1:
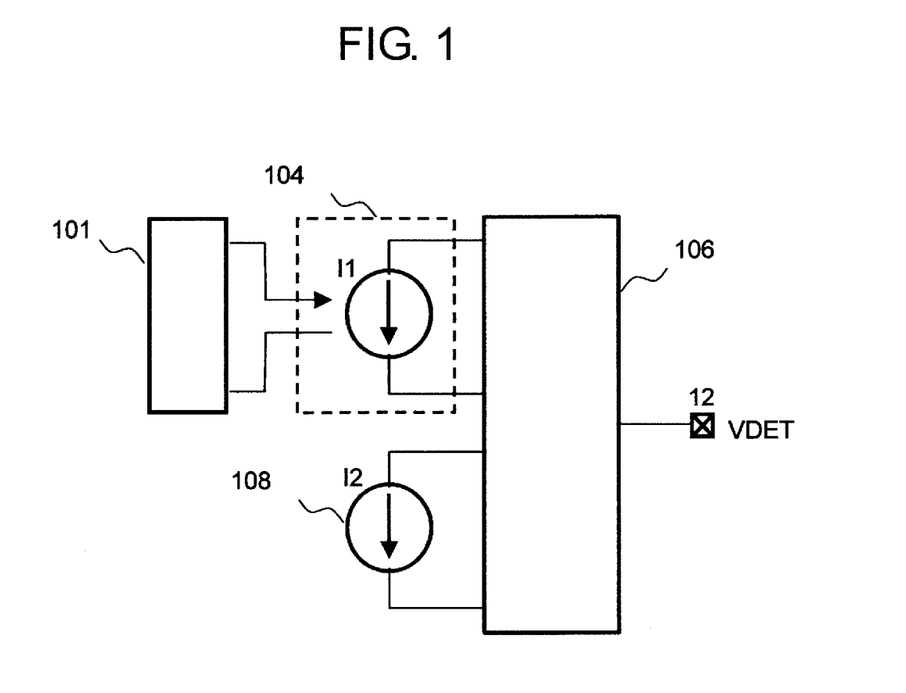
FIG. 1 is a block diagram for illustrating a temperature detection circuit according to an embodiment of the present invention.

FIG. 1 is a block diagram of a temperature detection circuit according to an embodiment of the present invention.

The temperature detection circuit in this embodiment includes a heat sensitive element 101, a constant current circuit 108, a voltage-controlled current circuit 104, and a current comparator 106.

The heat sensitive element 101 outputs a voltage Vd corresponding to temperature. The voltage-controlled current circuit 104 causes a constant current I1 to flow, which corresponds to the voltage Vd input from the heat sensitive element 101. The constant current circuit 108 causes a constant current I2 having temperature characteristics to flow. The voltage-controlled current circuit 104 and the constant current circuit 108 are designed to have the same circuit configuration so that the temperature characteristics of the constant current I1 and the temperature characteristics of the constant current I2 may similarly fluctuate due to manufacturing fluctuations. The current comparator 106 compares the constant current I1 and the constant current I2, and outputs a signal VDET serving as an output signal of the temperature detection circuit based on the result of comparison.

The temperature detection circuit configured as described above can reduce manufacturing fluctuations in detection temperature.

A method of adjusting manufacturing fluctuations in detection temperature of the temperature detection circuit in this embodiment is now described.

Figure 2A:
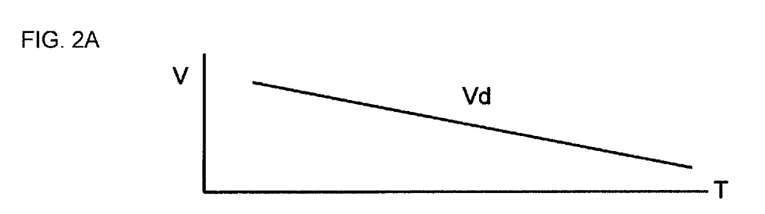
FIG. 2A to FIG. 2C are graphs for showing an adjustment principle of the temperature detection circuit according to the embodiment of the present invention.
Figure 2B:
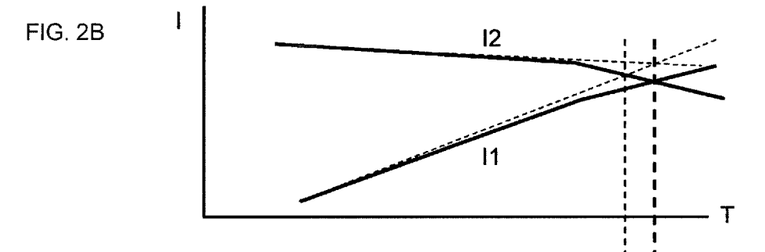
Figure 2C:
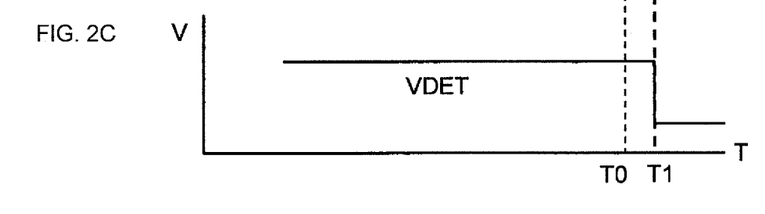

FIG. 2A to FIG. 2C are graphs for showing an adjustment principle of the temperature detection circuit in this embodiment.

FIG. 2A is a graph of temperature characteristics of the voltage Vd of the heat sensitive element 101. FIG. 2B is a graph of the temperature characteristics of the constant current I1 of the constant current circuit 104 and the temperature characteristics of the constant current I2 of the constant current circuit 108. FIG. 2C is a graph of the signal VDET.

The voltage Vd of the heat sensitive element 101 decreases in proportion to temperature. The constant current I2 of the constant current circuit 108 decreases in proportion to temperature. The current value of the constant current I2 without fluctuations is indicated by the broken line. The constant current I1 of the voltage-controlled current circuit 104 is set so as to increase correspondingly to the input voltage Vd. The current value of the constant current I1 before adjustment is indicated by the broken line.

The current comparator 106 compares the constant current I1 and the constant current I2, and outputs the signal VDET. An expected value of a temperature at which the signal VDET is inverted is a temperature T1 at which the broken-line constant current I1 and the broken-line constant current I2 cross with each other.

If the temperature characteristics of the constant current I2 of the constant current circuit 108 are changed to the characteristics indicated by the solid line of FIG. 2B due to manufacturing fluctuations, the signal VDET is inverted at a temperature T0 at which the broken-line constant current I1 and the solid-line constant current I2 cross with each other. In this case, when the temperature characteristics of the constant current I1 of the voltage-controlled current circuit 104 are set to the characteristics indicated by the solid line of FIG. 2B, the signal VDET can be inverted at the temperature T1 at which the solid-line constant current I1 and the solid-line constant current I2 cross with each other.

Consequently, even when the temperature characteristics of the constant current I2 of the constant current circuit 108 fluctuate, the detection temperature of the temperature detection circuit can be easily adjusted to the desired temperature T1.

Note that, the signal VDET can be inverted at the temperature T1 also by adjusting the temperature characteristics of the constant current I2 of the constant current circuit 108 to the characteristics indicated by the broken line.

Figure 3:
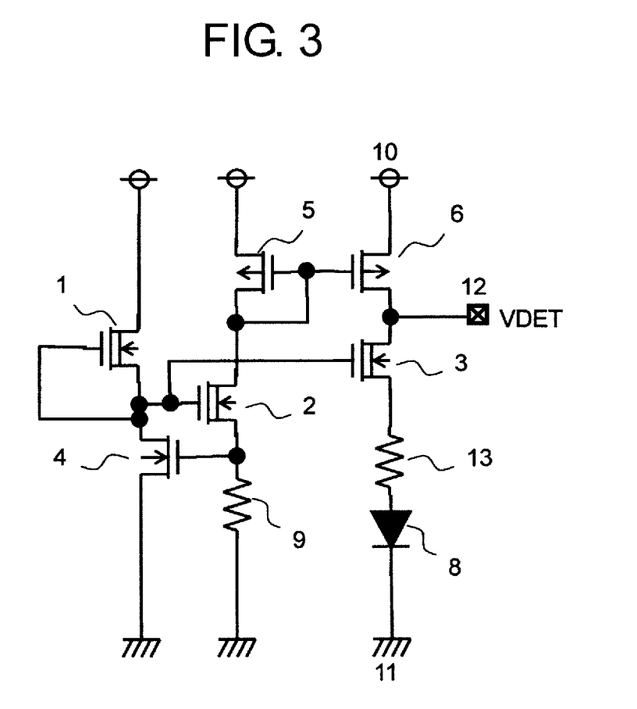
FIG. 3 is a circuit diagram for illustrating an example of the temperature detection circuit according to the embodiment of the present invention.

FIG. 3 is a circuit diagram for illustrating an example of the temperature detection circuit in this embodiment.

An N-channel depletion transistor 1 has a drain connected to a power supply terminal 10, and a source and a gate both connected to a drain of an N-channel transistor 4. The N-channel transistor 4 has a source connected to a ground terminal 11, and a gate connected to one end of a resistor 9. The resistor 9 has another end connected to the ground terminal 11. An N-channel depletion transistor 2 has a gate connected to the drain of the N-channel transistor 4, and a source connected to the one end of the resistor 9. A P-channel transistor 5 has a source connected to the power supply terminal 10, and a drain and a gate both connected to a drain of the N-channel depletion transistor 2. A P-channel transistor 6 has a source connected to the power supply terminal 10, a gate connected to the gate of the P-channel transistor 5, and a drain connected to the output terminal 12. An N-channel depletion transistor 3 has a drain connected to the output terminal 12, a gate connected to the gate of the N-channel depletion transistor 2, and a source connected to one end of a resistor 13. A diode 8 has an anode connected to another end of the resistor 13, and a cathode connected to the ground terminal 11. The P-channel transistor 5 and the P-channel transistor 6 form a current mirror.

The N-channel depletion transistor 2 forms the constant current circuit 108, and the N-channel depletion transistor 3 forms the voltage-controlled current circuit 104. The N-channel depletion transistor 3 further forms the current comparator 106 together with the P-channel transistor 6.

Operation of the temperature detection circuit in this embodiment is now described.

The N-channel depletion transistor 1 supplies a bias current to the N-channel transistor 4. The N-channel depletion transistor 2 and the N-channel transistor 4 form a negative feedback circuit. The N-channel transistor 4 is controlled so that a gate voltage of the N-channel transistor 4 becomes a constant voltage V2, which is determined by the bias current supplied from the N-channel depletion transistor 1 and a threshold voltage of the N-channel transistor 4.

Because the resistor 9 is connected to the gate of the N-channel transistor 4, a constant current I2=V2/R flows through the N-channel depletion transistor 2. The constant current I2 also flows through the P-channel transistor 5 and the P-channel transistor 6.

The N-channel depletion transistor 3 and the N-channel depletion transistor 2 have the common gate voltage, and hence a difference between the current values flowing through the N-channel depletion transistor 3 and the N-channel depletion transistor 2 is determined by respective source voltages.

The N-channel depletion transistor 3 has the source connected to the resistor 13 and the diode 8 serving as a heat sensitive element. An anode voltage of the diode 8 decreases along with an increase in temperature. The source voltage of the N-channel depletion transistor 3 thus decreases along with an increase in temperature. In other words, the constant current I1 caused to flow by the N-channel depletion transistor 3 increases along with an increase in temperature.

It is now assumed that the N-channel depletion transistor 2 and the N-channel depletion transistor 3 have the same characteristics, and the resistor 13 and the resistor 9 have the same temperature characteristics. In this case, the constant current I1 and the constant current I2 have substantially the same temperature characteristics. Thus, when a resistance value of the resistor 13 and a resistance value of the resistor 9 are set to have an appropriate ratio, the constant current I1 and the constant current I2 are reversed in magnitude at the desired temperature T1.

As described above, according to the temperature detection circuit in this embodiment, the temperature detection circuit having less manufacturing fluctuations in detection temperature can be realized.

Note that, even when the temperature characteristics of the constant current I1 and the temperature characteristics of the constant current I2 fluctuate, the desired detection temperature T1 can be obtained by enabling any one or both of the resistance value of the resistor 9 and the resistance value of the resistor 13 to be adjusted to an appropriate value and adjusting the resistance value after manufacture. In other words, the detection temperature can be easily adjusted against the manufacturing fluctuations.

Figure 4:
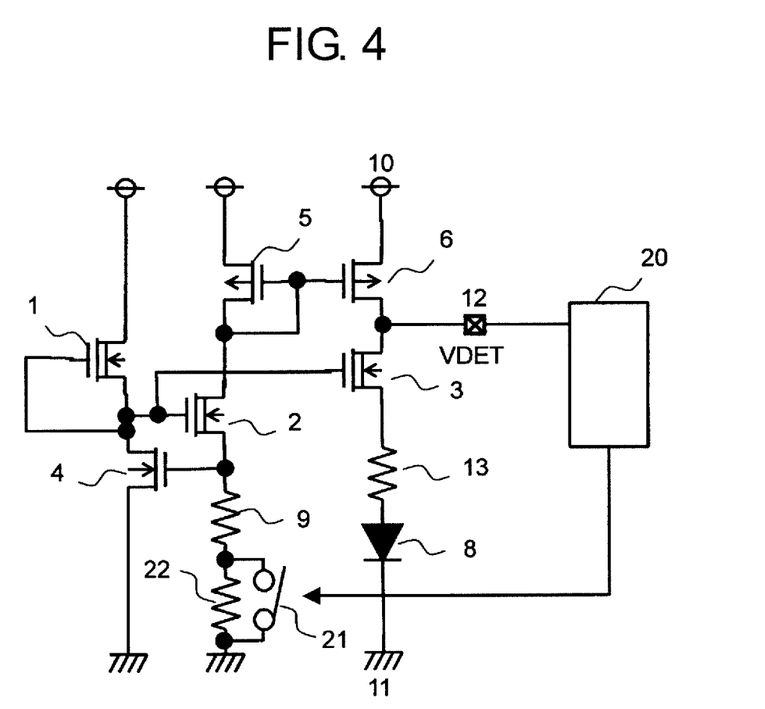
FIG. 4 is a circuit diagram for illustrating another example of the temperature detection circuit according to the embodiment of the present invention.

FIG. 4 is a circuit diagram for illustrating another example of the temperature detection circuit in this embodiment.

The temperature detection circuit of FIG. 4 further includes a control circuit 20, a switch 21, and a resistor 22. The other circuits are the same as those in FIG. 3.

The control circuit 20 inputs the signal VDET output from the output terminal 12, and outputs a signal for controlling the switch 21. The switch 21 is connected so that the resistance value of the resistor 9 may be changed based on an ON/OFF state of the switch 21.

With the above-mentioned configuration of the temperature detection circuit, the configuration of the temperature detection circuit can be switched between when temperature increases and when temperature decreases. In other words, a hysteresis can be provided to the temperature detection circuit, to thereby achieving more stable operation.

Figure 5:
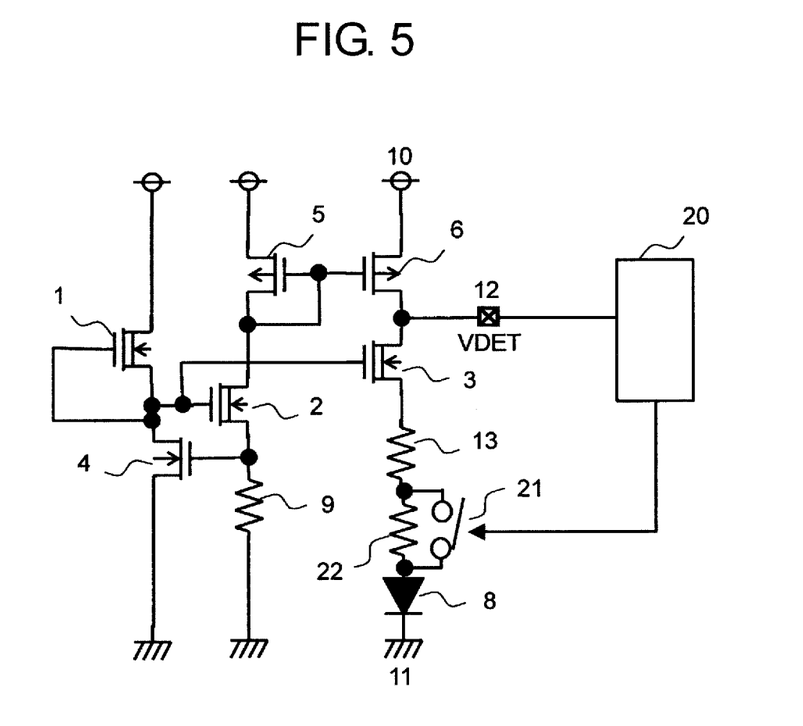
FIG. 5 is a circuit diagram for illustrating still another example of the temperature detection circuit according to the embodiment of the present invention.

FIG. 5 is a circuit diagram for illustrating still another example of the temperature detection circuit in this embodiment.

In the temperature detection circuit of FIG. 5, the switch 21 and the resistor 22 are connected to the resistor 13 so that the resistance value of the resistor 13 may be changed. The other circuits and circuit operations are the same as those of the circuits of FIG. 4, and hence a description thereof is omitted.

As described above, according to the temperature detection circuit in this embodiment, the temperature characteristics of the constant current circuit and the temperature characteristics of the voltage-controlled current circuit controlled by the voltage of the heat sensitive element have a correlation with each other. Consequently, there is an effect that manufacturing fluctuations in detection temperature are small and the detection temperature can be easily adjusted against the manufacturing fluctuations. Because a hysteresis is provided, there is another effect that the temperature detection circuit can detect temperature more stably.

Figure 7:
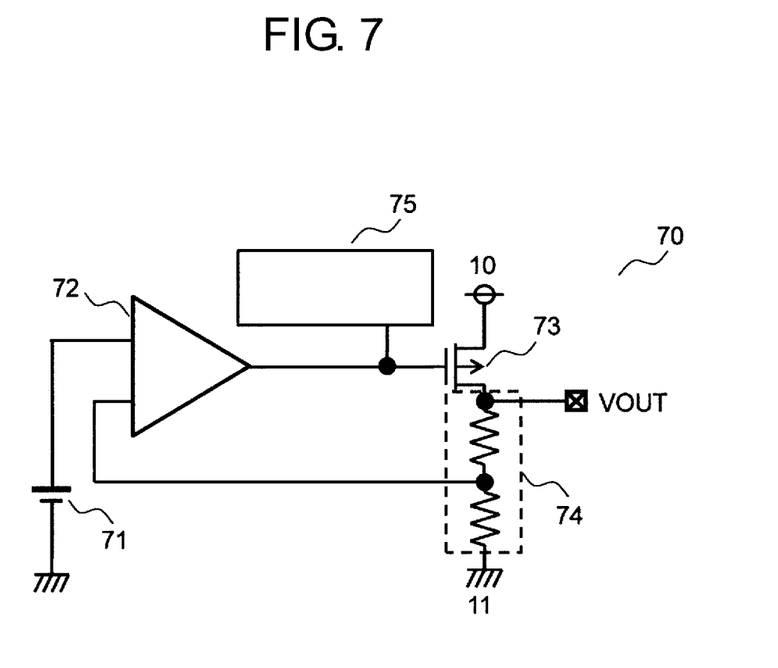
FIG. 7 is a circuit diagram for illustrating an example of a semiconductor device including an overheat protection circuit formed by the temperature detection circuit according to the embodiment of the present invention.

FIG. 7 is a circuit diagram for illustrating a voltage regulator as an example of a semiconductor device including an overheat protection circuit that uses the temperature detection circuit in this embodiment. A voltage regulator 70 includes a reference voltage circuit 71, an error amplifier 72, an output transistor 73, a voltage divider circuit 74, and an overheat protection circuit 75. The temperature detection circuit in this embodiment is applicable to the overheat protection circuit 75.

The use of the temperature detection circuit in this embodiment for an overheat protection circuit for a semiconductor device such as a voltage regulator can provide a highly safe product including an overheat protection circuit having temperature detection accuracy improved with simple adjustment.

What is claimed is:

1. A temperature detection circuit, comprising:
   a constant current circuit comprising a depletion transistor and configured to output a constant current;
   a heat sensitive element;
   a voltage-controlled current circuit comprising a depletion transistor and controlled by a voltage output from the heat sensitive element and configured to output a current corresponding to temperature; and
   a current comparator configured to compare the constant current and the current corresponding to temperature, and output a detection signal indicating that a predetermined temperature is detected,
   wherein temperature characteristics of the constant current circuit and temperature characteristics of the voltage-controlled current circuit are correlated with each other.

2. A temperature detection circuit according to claim 1, wherein the constant current circuit comprises an N-channel depletion transistor, and the voltage-controlled current circuit comprises an N-channel depletion transistor, and wherein the N-channel depletion transistors have the same gate voltage.

3. A temperature detection circuit according to claim 1, wherein the constant current circuit comprises:
   a first N-channel depletion transistor including a drain connected to a power supply terminal, and a source and a gate connected to each other;
   a first N-channel transistor including a source connected to a ground terminal, and a drain connected to the source and the gate of the first N-channel depletion transistor;
   a first resistor including one end connected to a gate of the first N-channel transistor, and another end connected to the ground terminal; and
   wherein the depletion transistor of the constant current circuit comprises a second N-channel depletion transistor including a source connected to the one end of the first resistor, and a gate connected to the drain of the first N-channel transistor,
   wherein the depletion transistor of the voltage-controlled current circuit comprises a third N-channel depletion transistor including a source connected to one end of the heat sensitive element, a gate connected to the gate of the second N-channel depletion transistor, and a drain connected to an output terminal of the temperature detection circuit,
   wherein the heat sensitive element comprises:
   a second resistor including one end connected to the source of the third N-channel depletion transistor; and
   a diode including one end connected to another end of the second resistor, and another end connected to the ground terminal, and
   wherein the current comparator comprises:
   a current mirror circuit including an input terminal connected to a drain of the second N-channel depletion transistor, and an output terminal connected to the output terminal of the temperature detection circuit; and
   the third N-channel depletion transistor.

4. A temperature detection circuit according to claim 3, wherein the first resistor comprises resistance varying means, and is configured to switch a resistance value of the first resistor based on the detection signal of the temperature detection circuit.

5. A temperature detection circuit according to claim 3, wherein the second resistor comprises resistance varying means, and is configured to switch a resistance value of the second resistor based on the detection signal of the temperature detection circuit.

6. A semiconductor device, comprising the temperature detection circuit of any one of claim 1.

7. A semiconductor device according to claim 6, further comprising an overheat protection circuit including the temperature detection circuit therein.

* * * * *

UNITED STATES PATENT AND TRADEMARK OFFICE
CERTIFICATE OF CORRECTION

PATENT NO. : 10,078,015 B2
APPLICATION NO. : 14/934323
DATED : September 18, 2018
INVENTOR(S) : Takao Nakashimo It is certified that error appears in the above-identified patent and that said Letters Patent is hereby corrected as shown below:

In the Claims

Claim 6, Column 6, Line 61: delete "any one of"

Signed and Sealed this
Fourteenth Day of May, 2019

Andrei Iancu
*Director of the United States Patent and Trademark Office*